Patented May 25, 1937

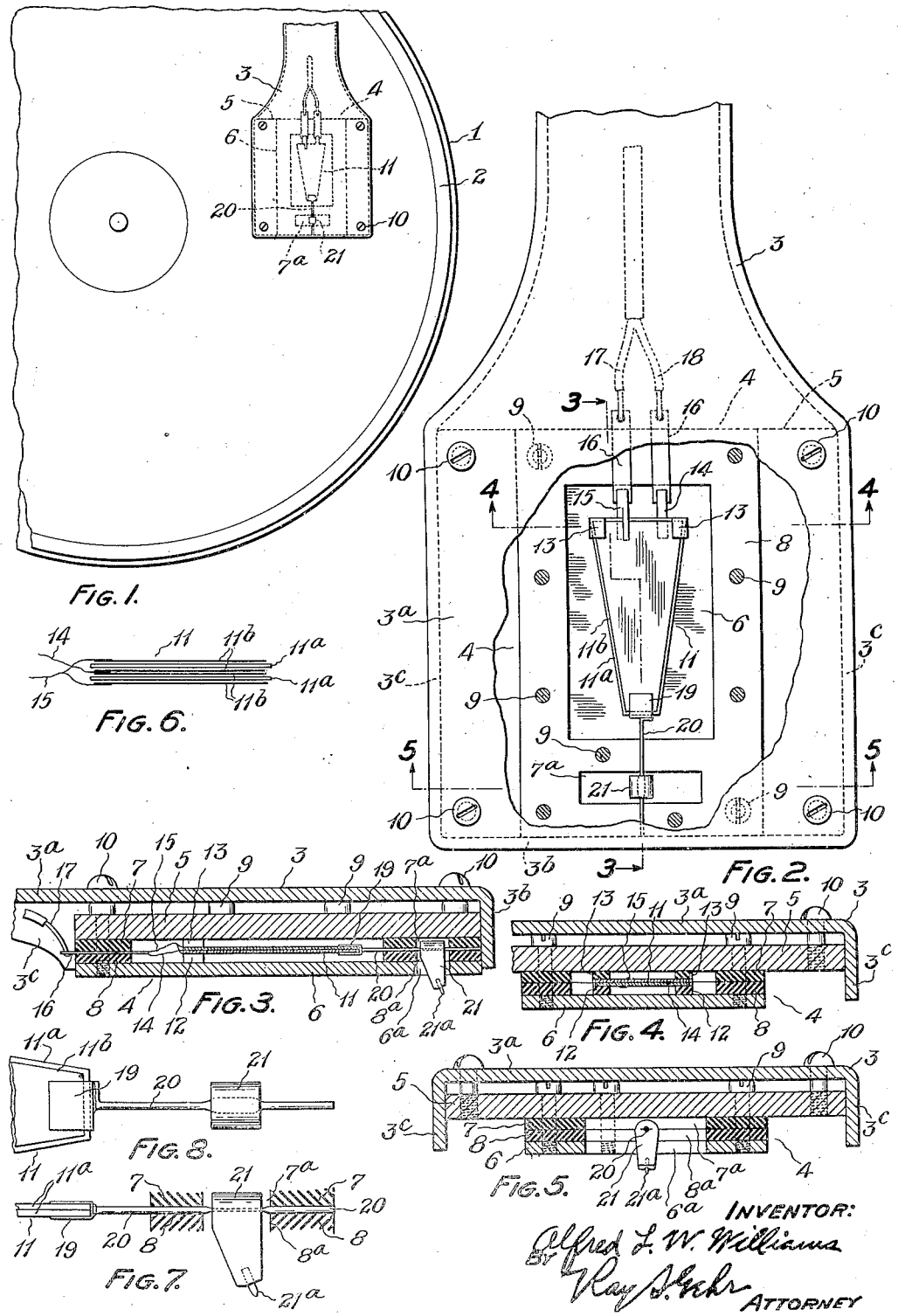

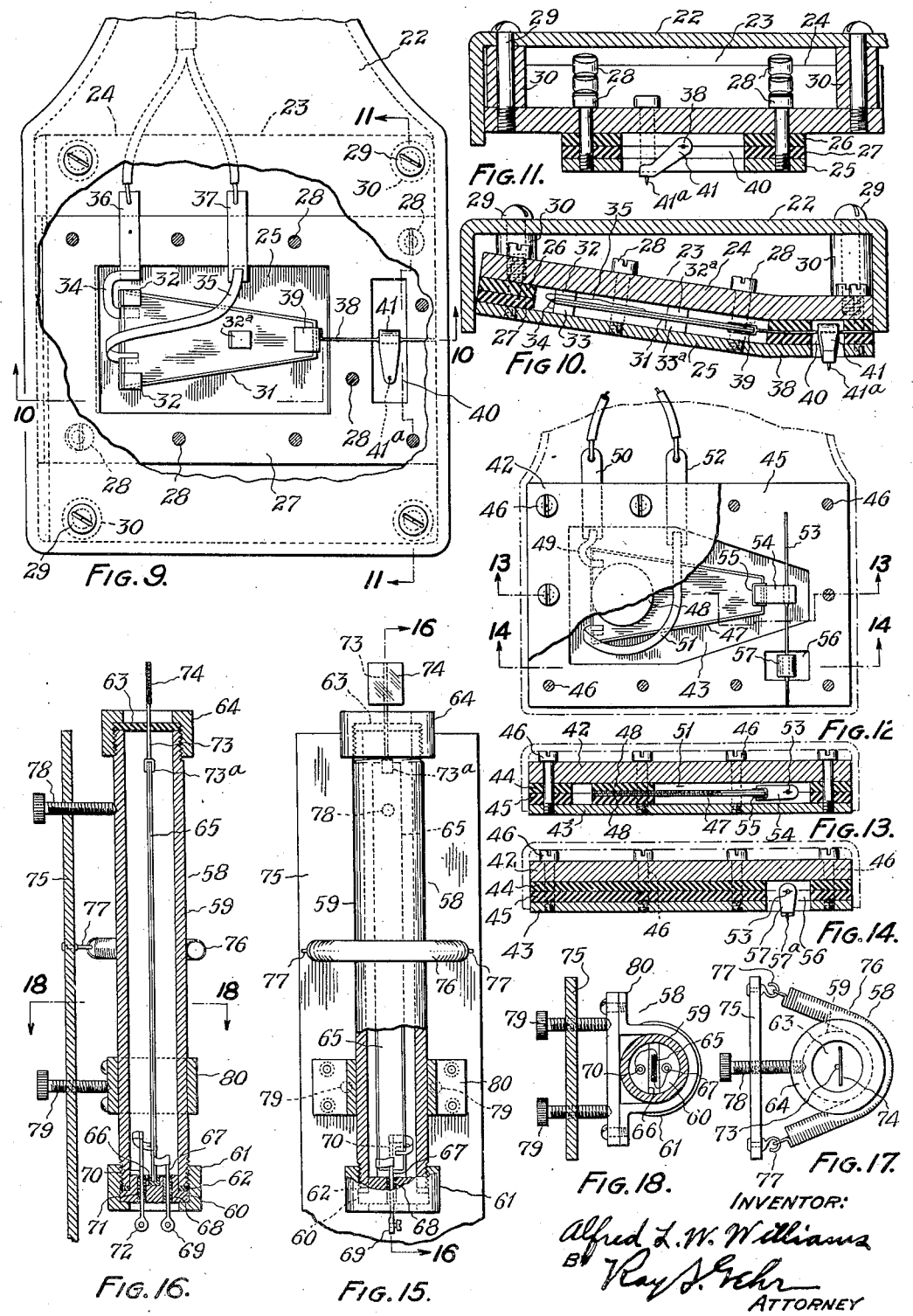

2,081,862

UNITED STATES PATENT OFFICE 2,081,862

PIEZOELECTRIC MOTOR AND GENERATOR DEVICE

Alfred L. W. Williams, Cleveland, Ohio, assignor to The Brush Development Company, Cleveland, Ohio, a corporation of Ohio Application December 23, 1935, Serial No. 55,796

13 Claims. (Cl. 171—327)

The invention relates to electric motor and generator devices in which the energy-translating means consists of a piezo-electric unit and preferably such a unit of the multiple-plate flexing type.

Piezo-electric units of the kind referred to are commonly made of crystalline material and it is desirable to enclose the crystalline structure so as to prevent access of air to it with resultant dehydration of the crystalline body or deposition of moisture upon it, as well as to provide a suitable support for mechanical protection of the unit. This is particularly true of Rochelle salt crystalline material, which is highly advantageous for use in such piezo-electric units by reason of its very high piezo-electric effect. The effective enclosure and protection of the piezo-electric unit without interfering with the transmission of motion to or from it in its operation as a generator or motor device has presented a problem of considerable difficulty.

The use of such piezo-electric units also presents problems more or less peculiar to specific applications of the units, such as phonograph electrical pickup and record-cutting devices.

One object of my invention is to provide a piezo-electric generator or motor device in which a piezo-electric unit is very effectively encased and protected from moisture and dehydration and is at the same time provided with simple and effective mechanical means for transmitting movement to or from the unit through the wall of its enclosing case.

A further object of the invention is the provision of an oscillatory piezo-electric generator or motor device in which the moving parts, both of the piezo-electric unit and of the motion-transmitting means associated with it, are light in weight and in operation have minimum inertia effects.

Another object of the invention is to provide an electromechanical energy-translating device having a mechanical system of such a nature that its stiffness can be altered by a simple and easily-made structural modification.

Another object of the invention is to provide an electromechanical energy-translating device having electrical characteristics that can be readily varied in the fabrication of the device without materially affecting its mechanical characteristics.

A further object of the invention is the provision of a piezo-electric generator or motor device with associated power-transmitting means which has resilient yielding characteristics so that the piezo-electric device is protected from shock incident to the mechanical transmission of power to or from it.

Another object of the invention is the provision of an encased piezo-electric unit with means for transmitting power through the wall of its enclosing case to or from the unit and comprising a flexible shaft or spindle having support in the wall of the casing and adapted to transmit power torsionally.

Another object of the invention is the provision of an electric phonograph pickup or record-cutting device employing an enclosed piezo-electric generator or motor device of the character above referred to.

A further object of the invention is the provision of an improved piezo-electric oscillograph apparatus embodying certain of the features above described.

Still other objects of the invention more or less incidental or ancillary to the foregoing will be apparent from the further explanation of the invention which follows.

With the foregoing objects in view the invention consists in certain features of construction and combinations of parts hereinafter explained and defined.

The invention, in some at least of its aspects, is applicable to a wide variety of uses among which may be mentioned phonograph pickups, phonograph record-cutting devices and oscillographs. For purposes of explanation I have in the accompanying drawings shown the invention embodied in phonograph pickups of different forms of construction and in an oscillograph element.

In the drawings, Fig. 1 is a plan view showing an embodiment of the invention in the form of a phonograph pickup adapted for use in connection with laterally-cut records, together with a portion of a turn-table and phonograph record with which the pickup cooperates.

Fig. 2 is an enlarged plan view of the phonograph pickup, including a portion of the pickup arm, with some of the parts broken away to illustrate interior construction.

Fig. 3 is a vertical section on the line 3—3 of Fig. 2.

Fig. 4 is a vertical section on the line 4—4 of Fig. 2.

Fig. 5 is a vertical section on the line 5—5 of Fig. 2.

Fig. 6 is an enlarged expanded edge view of the piezo-electric unit shown in Figs. 1 to 5.

Figs. 7 and 8 are, respectively, enlarged side elevation and plan view of the stylus arm and some of its associated parts.

Fig. 9 is an enlarged plan view corresponding to Fig. 2 but showing a modified form of pickup embodying the invention and adapted to cooperate with vertically cut or "hill and dale" records.

Fig. 10 is a vertical section on the line 10—10 of Fig. 9.

Fig. 11 is a vertical section on the line 11—11 of Fig. 9.

Fig. 12 is a plan view of another modified form of phonograph pickup embodying features of the invention, some of the parts being broken away to disclose interior construction.

Fig. 13 is a vertical section on the line 13—13 of Fig. 12.

Fig. 14 is a vertical section on the line 14—14 of Fig. 12.

Fig. 15 is a front elevation of an oscillograph element or light beam deflecting device embodying the invention.

Fig. 16 is a section on the line 16—16 of Fig. 15.

Fig. 17 is a plan view of the oscillograph element.

Fig. 18 is a section taken on the line 18—18 of Fig. 16.

Referring first to the construction illustrated in Figs. 1 to 8, inclusive, 1 designates a phonograph turn-table, 2 a record of the laterally-cut type mounted on the turn-table and 3 a portion of the pickup arm of the phonograph. The arm 3, which is in the form of a sheet metal stamping, preferably of aluminum alloy or the like, comprises a main wall or web 3a, an end wall 3b and side walls 3c, 3c. That end of the arm 3 which is broken away is pivotally mounted, in well known manner, to swing vertically and laterally.

The pickup proper, which is designated as an entirety by 4, comprises a frame and casing structure made up of a top plate 5, bottom plate 6, two thick gaskets 7, 8 of soft rubber, or other soft elastic material, and screws 9, 9 which serve to secure the plates and gaskets together as shown. The top plate 5 as shown is square in outline so as to fit within the end and side walls 3b, 3c of the arm 3, the casing being rigidly attached to said arm by screws 10, 10. The gaskets 7 and 8 and the bottom plate 6 are made narrower than the top plate 5, as is clearly shown in Figs. 2 and 5. The plates 5, 6 are preferably made of metal.

Within the pickup casing is operatively mounted a piezo-electric unit 11 which is of the multiple-plate flexing type which in operation flexes torsionally. The piezo-electric unit as illustrated is trapezoidal in outline and comprises two plates 11a, 11a of Rochelle salt crystal or the like, each plate having a thin electrode 11b attached to each of its faces and the two electroded plates being firmly cemented together. In Fig. 6 the plates and electrodes are expanded or separated to better show the construction. The plates 11a, 11a have their faces cut parallel to the b and c axes of the Rochelle salt crystal from which they are formed and their parallel end edges parallel to one of said axes. With the crystalline plates thus oriented the unit which they constitute flexes in torsion about its longitudinal axis when the plates are subjected to electrostatic fields caused by electromotive forces applied to their electrodes and, vice versa, when the unit is so flexed in torsion electromotive forces are generated at its electrodes. Piezo-electric units of this character are now well known and reference may be made to United States Patent No. 1,803,275, April 28, 1931, for a detailed description of such units. The specific construction of the unit illustrated is presented for purposes of illustration and it will be understood that other known alternative constructions may be employed.

The unit 11 is operatively supported at its wider end by a pair of blocks or pads 12, 12 of somewhat yielding material, such as soft rubber, between the unit and plate 6 and a similar pair of blocks 13, 13 between the unit and the top plate 5 of the case structure. The unit 11 is fitted with a thin ribbon conductor or lead 14 which is connected to the internal electrodes of the unit and with a similar lead 15 which is connected to the two outer electrodes of the unit 11. Each of the leads 14 and 15 is connected with a metal terminal plate 16 which is clamped between the rubber gaskets 7, 8. The outer ends of the terminal 16 are connected to the conductors 17, 18 which are adapted to be connected with suitable amplifying or translating devices.

The narrower end of the piezo-electric unit 11 has cemented to it a light metal clamp 19 to which is soldered, brazed or riveted one end of a slender shaft or spindle 20 which is clamped between the gaskets 7 and 8 as shown in Fig. 3. The spindle 20 is preferably formed of steel and in practice may be formed of piano wire. As is shown in Figs. 2, 3, and 5, the bottom plate 6 of the casing structure and the gaskets 7 and 8 are formed with apertures 6a, 7a and 8a which together form a downwardly opening recess in the casing structure in which is disposed a stylus arm 21 which is rigidly mounted on the spindle 20 and at its lower end is fitted with a jewel stylus 21a. The stylus arm 21 is preferably made of celluloid or the like in order to secure lightness. As shown, it is attached to the spindle 20 by forming the arm with a circular aperture to receive the spindle and forcing the arm over a flattened portion of the spindle as indicated in Figs. 5, 7, and 8, the flattened portion of the spindle serving to cut its way into the softer material of the arm and form a rigid connection.

In assembling the pickup device the soft rubber gaskets 7 and 8 are sufficiently compressed by means of the fastening screws 9, 9 to form air tight seals around the spindle 20 and the terminal conductor strips 16, 16. As a result the crystal unit 11 is enclosed hermetically, or substantially so, and is thus effectively protected both from moisture and from dehydration.

When the above described pickup device is placed in operation the lateral undulations in the groove of the laterally-cut phonograph record cause the stylus arm 21 to vibrate through small angles about the axis of the torsional spindle 20 and these vibrations are transmitted to the crystal unit 11 and cause it to correspondingly vibrate torsionally. Due to the piezo-electric properties of the unit 11, a corresponding alternating electromotive force is developed between the terminals 16, 16 which may be used, with suitable amplification, to actuate loud speakers or to actuate other apparatus in well known manner.

By reason of the slender form and elastic character of the spindle 20 the latter may be designed to yield more or less torsionally, thus permitting the driven end of the crystal unit to vibrate through a much smaller angle than that described by the stylus arm. Crystal units of convenient size and periodicity may be relatively stiff and if the torque member 20 were rigid then excessive vibratory pressure would have to be exerted on the stylus by the record groove in order to twist the crystal unit vibrationally in accordance with the variations in the record groove. A suitable yielding elastic torque spindle, however, is capable of causing sufficient movement of the crystal unit yet permits very light stylus pressure and thus greatly aids in prolonging the useful life of both record and stylus. Furthermore, by the use of an elastic yielding torque spindle it is possible to alter the size of the crystal unit to obtain a different voltage output without materially affecting the stylus pressure on the record because the yielding spindle makes that pressure to a large extent independent of the stiffness of the crystal unit. Obviously the yielding character of the torsion member 20 enables it to act as a shock absorber in the case of abnormal movements of the stylus arm. Thus if the pickup is accidentally dropped on the record or turn-table the stylus arm is permitted to swing wholly within the recess in which it is disposed and excessive movement of the crystal unit is prevented. Again, because of the small diameter of the torsion member 20 and the light weight and relatively short length of the stylus arm, and also because of the small width and light weight of the crystal element itself, the inertia effects of the entire moving system are low and this results in more faithful reproduction of the record as well as less wear of the undulatory surfaces of the record groove.

It will be observed that the spindle 20 serves to support the adjacent end of the crystal unit and thus tends to hold the torsional axis of the unit straight without interfering with the desired torsional flexing of the crystal unit in response to the movements of the stylus arm. This contributes both to efficiency and faithfulness of reproduction.

Due to the small range of the rotary motion of the spindle 20 in operation, the spindle does not slide on the surface of the rubber gaskets, as does a shaft in a bearing, but rather the more or less compressed rubber adheres to the surface of the spindle and moves with it with corresponding distortion of the rubber. Thus, because of the elastic yielding character of the gasket material, the latter tends to restrain the motion of the stylus arm away from its normal position and to aid in restoring it to normal position in much the same manner as would a spring placed between the stylus arm and the case of the pickup. This spring effect of the gaskets will vary with the character and thickness of the gasket material used and the pressure applied to the gaskets by the plates 5 and 6 of the casing. By suitable choice of gasket material and of wire for the torque member 20, a wide range of effects may be obtained to suit various requirements. Such variations of stylus pressure are subject to the limitations of minimum useable torque applied to the crystal element, but I have found that pickups of this design have adequate electrical output even when a highly yielding torque spindle is employed. I am thus able to provide a vibrating system which is capable, in transmitting motion, to yield to a very high degree and thus permit wide variation of the stiffness of the energy-translating element, as previously described.

The size of the piezo-electric energy-translating element used may depend on several factors such as the electrical impedance, electrical output and frequency of mechanical resonance desired. In general a larger unit has lower impedance, higher output voltage and a lower resonance frequency. Such elements may readily be constructed having sufficient output, with the slight motion imparted to it by the flexible spindle, and with the mechanical resonance frequency above the range of frequencies recorded in the record.

The relatively short length of the stylus arm 21, which is made possible by the form and arrangement of the translating unit 11 and the character of the mechanical connections between that unit and the stylus arm, is an advantageous feature making possible the use of highly yielding torsion spindle since the turning effect about the point of the stylus of the unbalanced weight of the pickup varies less for a given angular displacement of the short stylus arm than it would for corresponding displacements of a longer arm.

The pickup illustrated in Figs. 9, 10, and 11 has many features in common with the pickup already described but embodies some special features incident to the adaptation of the device for use with phonograph records of the vertically-cut or "hill and dale" type. In this second construction the pickup arm 22 is similar to that first described. The pickup, which is designated in its entirety by the numeral 23, has a casing comprising a top plate 24, a bottom plate 25, gaskets 26, 27 of soft rubber or the like and fastening screws 28, 28. As in the first construction the top plate is substantially square and the bottom plate and gaskets are rectangular but the pickup is arranged in the arm 22 with the rectangular plate and gaskets disposed transversely of the arm instead of lengthwise thereof as in the first described pickup. In addition, the pickup casing has the top and bottom plates bent, as best shown in Fig. 10, for a purpose which will presently be explained. The pickup casing is clamped or secured in the end of the arm 22 by means of screws 29, 29 which are provided with spacing sleeves 30, 30 to properly position the casing in relation to the arm.

The pickup casing encloses a piezo-electric unit 31 which is in all respects like the unit 11 previously described and which is operatively supported between the top and bottom plates by blocks 32, 33 and 32a, 33a of slightly yieldable material such as rubber. The two pairs of opposing blocks 32, 33 disposed at the corners of the wider end of the unit 31 hold said end against twisting about the longitudinal axis of the unit while the blocks 32a, 33a disposed on said axis serve to prevent bending or buckling of the axis of the unit without materially interfering with the twisting of the unit. It will be obvious that use can be made of such stabilizing supports as blocks 32a, 33a in other embodiments of my invention utilizing torsional crystal units. Flat ribbon leads 34 and 35 connect the inner electrodes and the outer electrodes, respectively, of the crystal unit with the flat terminal strips 36, 37 which are tightly clamped between the gaskets 26, 27. A flexible and highly elastic spindle 38 of piano wire or the like is rigidly attached to clamp 39 cemented on the adjacent end of the crystal unit 31 and is operatively supported by the gaskets 26, 27, as shown in Fig. 10. The spindle 38, as well as the terminal strips 36 and 37, is closely embraced by the rubber gaskets and when the casing plates 24 and 25 are drawn together by the screws 28 the crystal unit 31 is hermetically enclosed.

As in the first form of construction the bottom plate 25 and gaskets 26, 27 of the casing structure are apertured to form a recess 40 in which is disposed a stylus arm 41 which carries a jewel stylus 41a and is rigidly fixed on the spindle 38. The arm 41 extends at an angle to the vertical since the pickup is intended to work with vertically-cut phonograph records.

In the operation of the last described pickup the vibratory rising and falling of the stylus arm 41 as the stylus follows the record groove is transmitted through the torsion spindle 38 to the crystal unit 31 which is torsionally flexed in the manner previously described with resultant generation of electromotive forces at the terminals 36, 37 of the unit.

The previously described advantages incident to the first form of pickup are found also in the second pickup. In addition, the slender flexible form of the spindle 38 permits flexing of the spindle to accommodate the bent or angular form of the casing structure. The gaskets 26 and 27 are formed so that they present a support for the spindle 38 in the region between the bends in the plates 24 and 25 so that the spindle has its two straight portions adequately supported and held in proper axial alignment by the gaskets without undue interference with the vibratory rotation of the spindle.

The location of the stylus arm 41 near one side of the pickup arm makes the pickup extend rather widely at one side of the stylus arm with resultant tendency to interference between the pickup and the record if a record of the flexible type is used. This is obviated by bending the major portion of the casing upwardly at an inclination, as shown in Fig. 10, so as to increase the clearance between such portion and the record. This bent housing design could obviously be used with the pickup illustrated in Figs. 1, 2, and 3.

In the form of pickup which is illustrated in Figs. 12, 13, and 14 the casing structure of the pickup is of the same general character as the two pickups already described and comprises rigid top and bottom plates 42 and 43, rubber gaskets 44 and 45 and screws 46, 46 for securing said plates and gaskets together. The casing structure so formed encloses a piezo-electric crystal unit 47 of which the component crystal plates are so oriented in relation to the crystalline axes that the unit in operation bends about transverse axes rather than torsionally about a longitudinal axis. Piezo-electric units of this character are described in United States Letters Patent No. 1,802,782, April 28, 1931, to which reference may be made for a more detailed disclosure. The crystal unit is operatively supported by slightly yielding blocks or pads 48, 48 interposed between the unit and the top and bottom plates of the casing. As in the first described construction the inner electrodes of the crystal unit are joined by a lead 49 to a terminal plate 50 and the outer electrodes of the unit are joined by a lead 51 to a terminal plate 52, the plates 50 and 52 being frictionally clamped between the gaskets 44, 45.

Adjacent the unsupported end of the crystal unit 47 is arranged a slender spindle 53 of piano wire or other suitable elastic material, said spindle being clamped between the gaskets 44 and 45. This spindle is operatively connected to the adjacent end of the unit 47 by means of an arm 54 which is rigidly secured on the spindle and has its outer end recessed to embrace the end of the unit 47 with an intervening cushion 55 of rubber or the like. As in the previously described pickups the gaskets 44 and 45 and the bottom plate 43 of the casing structure are apertured to form a recess 56 in which is disposed a stylus arm 57 rigidly attached to the spindle 53, the stylus arm being fitted with a jewel stylus point 57a.

It will be understood that the pickup illustrated in Figs. 12, 13, and 14 is adapted to be attached to a phonograph arm and a portion of such arm is shown in dotted lines.

The last described pickup is intended for use in connection with laterally recorded phonograph records and in the operation of the pickup the vibratory movement of the stylus arm corresponding to the undulatory record grooves is transmitted by the oscillatory rotation of the spindle 53 and the vibratory swinging of the spindle arm 54 to the crystal unit 47 which is thus bent about transverse lines with resultant generation of corresponding electromotive forces at the terminals of the unit.

The third form of pickup presents some at least of the advantages incident to the use of the elastically yieldable torsional spindle for transmitting movement from the stylus arm to the piezo-electric unit but it obviously lacks the extreme simplicity of the other two forms of pickup in which the torsional spindle is rigidly connected to a torsional type of piezo-electric unit.

As is well known piezo-electric units such as those described are adapted to function either as electric generators or as motors. Thus the devices which have been described are readily adapted for use in cutting phonograph records. For such use a piezo-electric unit heavier and more powerful than that suitable for pickup use is required and the torsion spindle connecting the piezo-electric unit with the stylus arm should be made so as not to yield torsionally in order that sufficient force may be transmitted to the stylus to perform the cutting operation. Also the device is, of course, to be equipped with a special stylus such as is used for record-cutting purposes.

In Figs. 15 to 18, inclusive, I have shown apparatus embodying the energy-translating device provided by my invention in a form adapted to vibrate a mirror or reflector in response to an applied alternating E. M. F. for use in oscillographs and similar applications. In this apparatus, 58 designates as an entirety a casing structure comprising a tube section 59 of any suitable metal, and a bottom end closure plug 60 which is secured in the end of the tube 59 by means of a union coupling 61, a gasket 62 of rubber or the like being interposed between the plug 60 and the tube to provide an air-tight joint. The other end of the casing is closed by means of a disk 63 of soft rubber or the like which is clamped to the end of the tube by a threaded ring or coupling 64.

Within the casing thus formed is mounted an elongated crystalline piezo-electric unit 65 of the torsional type, said unit consisting of two strip-like crystalline plates which are oriented in relation to the crystalline axes, provided with electrodes and cemented together in the ways described in connection with the piezo-electric unit 11. The lower end of the unit 65 is secured in a recess formed in the plug 60 by cement 66 or the like. The inner electrodes of the unit 65 are connected to a conductor 67 which extends through an insulating sleeve 68 in the plug 60 and at its outer end carries a terminal 69. Similarly a conductor 70 is connected to the outer electrodes of the unit 65, extends through an insulating sleeve 71 and carries at its outer end a terminal 72. Air-tight joints between the conductors 67, 70 and the plug 60 are formed by the sleeves 68 and 71 which may be made of rubber or the like. The upper end of the crystal unit 65 is connected to a slender spindle 73, the spindle being fitted with a jaw or clamp 73a which embraces and is firmly cemented to the end of the unit 65. The spindle 73 extends through the rubber closure disk 63 which is pierced for that purpose and which affords support for the upper part of the crystal unit 65 and helps to maintain its longitudinal axis in alignment with the lower part of the unit which is attached to the bottom plug 60 of the casing structure. The spindle 73 is snugly engaged by the rubber disk 63 so that the joint between the two is air tight.

The spindle 73 carries on its upper end a reflector plate or mirror 74 which is fixedly soldered or cemented to the spindle.

The casing structure of the instrument is adjustably supported on a board or plate 75 by means of a coil spring 76 which is drawn around the body of the casing structure by having its ends attached to hooks 77, 77 carried by the plate 75. The spring 76 presses the casing structure against a series of three screws 78, 79, 79 which are adjustably mounted in the plate 75. The upper screw 78 engages a recess in the upper part of the casing tube 59 and the two bottom screws 79 engage similar recesses in a bracket structure 80 which is clamped to the lower part of the casing tube 59. By adjustment of the three screws the casing structure of the instrument can be adjusted rotatably about its axis and can have its longitudinal axis adjusted angularly in relation to the supporting plate.

When an alternating E. M. F. is applied between the terminals 69 and 72 the reflector 74 is set in corresponding oscillation substantially about the axis of the torque spindle 73 and the angle through which it oscillates is substantially proportional to the applied E. M. F. A direct current potential applied to the terminals of the instrument causes a proportionate constant deflection of the mirror. When a suitable light beam is focused on a screen by reflection from the mirror the spot of light appearing on the screen moves a considerable distance for a very small motion of the mirror and the motion of the spot is a measure of the E. M. F. applied to the instrument. Similarly, the beam of light may be focused upon a traveling sensitized film which when developed gives a permanent record of the oscillatory movement of the mirror. The use of oscillating mirrors actuated by electrical impulses for study of electrical wave forms, for television scanning and other applications is well understood by persons familiar with oscillographs and their use need not be further explained.

The operating characteristics of the oscillograph can be varied or modified to a considerable extent by varying the dimensions of the crystal unit 65, the diameter and length of the spindle 73, the weight of the mirror 74 and the thickness and softness of the rubber disk 63.

When my oscillograph device is to be used at one frequency only, as in television scanning, greater amplitude of movement of the mirror may be obtained by the use of a more slender torque spindle adapted to more readily yield torsionally. The torsional flexibility of the spindle, the restraining force of the rubber disk 63 and the moment of inertia of the mirror may be so related that the frequency of mechanical resonance of the combination of the above enumerated parts coincides with the operating frequency of the device. Under the above conditions the amplitude of oscillation of the mirror may be much greater than the amplitude of motion of the crystal unit. By taking advantage of the mechanical resonance in such applications, the device may be operated at much lower voltages for a given amplitude of motion.

In the foregoing embodiments of my invention I have shown the torsion spindle carried through a wall section of the enclosing casing formed of soft elastic material such as rubber. In applications where air tightness of the enclosing casing of the piezo-electric unit is essential I prefer to secure such tightness by supporting the torsion spindle in rubber or the like, but a satisfactory degree of tightness, for some applications at least, can be secured by giving the spindle a sliding engagement with its bearing support in the casing wall and providing other known expedients for rendering the bearing joint air tight. I consider the types of construction which I have illustrated far superior because of their simplicity and the possibility of utilizing the elasticity of the rubber wall section to modify the operating characteristics in the manner previously explained.

While the forms of construction which have been illustrated and described are such as I prefer for the uses indicated for them, it will be understood that the embodiment of the invention may be widely varied from the constructions shown within the scope of the appended claims defining the invention.

What I claim is:

1. In a piezo-electric apparatus, the combination of a Rochelle salt multiple-plate piezo-electric unit adapted in operation to flex torsionally; a case substantially hermetically enclosing the unit; means operatively supporting the unit in the case; and a rotatable spindle attached to the unit with the axis of the spindle in line with the torsional axis of the unit, said spindle being extended through a wall section of the case with an air-tight joint between the spindle and wall and being adapted by torsional stress to transmit vibrational motion through the wall of the case to and from the unit.

2. In a piezo-electric apparatus, the combination of a Rochelle salt multiple-plate piezo-electric unit adapted in operation to flex torsionally; a case substantially hermetically enclosing the unit and comprising a wall section formed of soft elastic material; means operatively supporting the unit in the case; and a rotatable spindle attached to the unit with the axis of the spindle in line with the torsional axis of the unit, said spindle being extended through the said wall section of the case with an air-tight engagement between the spindle and the said soft material of the wall section, said spindle being adapted by torsional stress to transmit vibrational motion through the wall of the case to and from the unit.

3. In a piezo-electric apparatus, the combination of a piezo-electric unit; a case substantially hermetically enclosing the unit, said case comprising two opposite rigid wall sections and two gaskets of soft elastic material clamped between the rigid sections and together forming wall sections of the case; and a slender rotatable spindle connected to the said unit and extending through a wall section of the casing between the said soft gaskets, said spindle being adapted by torsional stress to transmit vibrational motion through the wall of the case to and from the unit.

4. In a piezo-electric apparatus, the combination of a piezo-electric unit having electrodes of opposite polarity; a case substantially hermetically enclosing the unit and comprising two opposite rigid wall sections and two gaskets of soft elastic material clamped between the rigid sections and together forming wall sections of the case; means operatively supporting the unit in the case; conductors respectively connected with the electrodes of opposite polarity of the said unit and extending through a wall section of the case between said gaskets; and a slender rotatable spindle connected to the said unit and extending through a wall section of the case between the said soft gaskets, said spindle being adapted by torsional stress to transmit vibrational motion through the wall of the case to and from the unit.

5. In a piezo-electric apparatus, the combination of a flat, multiple-plate piezo-electric unit adapted in operation to flex torsionally; a case enclosing the unit with two opposite walls disposed adjacent and parallel to the faces of the unit; means operatively supporting the unit in the case adjacent one edge of the unit; and a rotatable spindle attached to the opposite edge of the unit and extending parallel to the plane of the unit through a wall of the case, said spindle being adapted by torsional stress to transmit vibrational motion through the wall of the case to and from the unit.

6. In a piezo-electric apparatus, the combination of a flat, multiple-plate piezo-electric unit adapted in operation to flex torsionally; a case enclosing the unit with two opposite walls adjacent and parallel to the faces of the unit; means operatively supporting the unit in the case adjacent one edge of the unit; a rotatable spindle attached to the opposite edge of the unit and extending parallel to the plane of the unit through a wall of the case; and a stylus arm mounted on the spindle outside the case, the said spindle being adapted by torsional stress to transmit vibrational motion of the stylus arm to the piezo-electric unit and from the said unit to the stylus arm.

7. In a piezo-electric apparatus, the combination of a multiple-plate piezo-electric unit adapted in operation to flex torsionally; a case enclosing the unit; means operatively supporting the unit in the case; a rotatable spindle attached to the unit with the axis of the spindle in line with the torsional axis of the unit, said spindle being extended through a wall of the case; and a stylus arm mounted on said spindle outside the case, the spindle being adapted to yield elastically in torsion to a substantial extent in transmitting vibratory motion from the stylus arm to the piezoelectric unit and from said unit to the stylus arm.

8. In a piezo-electric apparatus, the combination of a piezo-electric unit; a case substantially hermetically enclosing the unit, said case comprising two opposite rigid wall sections and two gaskets of soft elastic material clamped between the rigid sections and together forming wall sections of the case; a rotatable spindle connected to the said unit and extending through a wall of the casing between the said soft gaskets; and a stylus arm mounted on the spindle outside the casing, said spindle being adapted in operation to yield torsionally to a substantial extent and to transmit vibratory motion through the wall of the case from the stylus arm to the unit and from the unit to the stylus arm.

9. In a piezo-electric apparatus, the combination of an elongated multiple-plate piezo-electric unit adapted in operation to flex torsionally about a longitudinal axis, said unit having electrodes of opposite polarity; a casing substantially hermetically enclosing the unit comprising a tubular part, a member closing one end of the tubular part and constituting a fixed support for one end of the said unit and means for closing the other end of the tubular member comprising a wall section of soft elastic material; conductors connected, respectively, to the electrodes of opposite polarity of the enclosed unit and extending through the wall of the casing; a rotatable spindle attached to the other end of the piezo-electric unit and extending through the soft elastic wall section with an air-tight joint; and a mirror attached to the spindle outside of the casing to turn with the spindle when the piezo-electric unit is energized.

10. In a piezo-electric apparatus, the combination of an elongated multiple-plate piezo-electric unit adapted in operation to flex torsionally about a longitudinal axis; a casing substantially hermetically enclosing the unit and comprising a wall section of soft elastic material disposed opposite one end of the said unit; means in the casing for supporting the other end of the unit; a slender rotatable spindle attached to the first named end of the unit and extending through the soft elastic wall section with an air-tight joint, the said wall section being adapted to permit vibratory rotational movement of the spindle in unison with torsional vibratory movement of the piezo-electric unit without relative sliding of the spindle in its joint with the wall section; and a mirror attached to the spindle outside of the casing to turn with the spindle when the piezo-electric unit is energized.

11. In a piezo-electric apparatus, the combination of a multiple-plate piezo-electric unit adapted in operation to flex torsionally; a case enclosing the unit; means operatively supporting the unit in the case; and a rotatable spindle attached to the unit with the axis of the spindle in line with the torsional axis of the unit, said spindle being extended through a wall of the case and adapted in operation to yield elastically in torsion to a substantial extent in transmitting vibratory motion to and from the piezo-electric unit.

12. In a piezo-electric apparatus, the combination of a piezo-electric unit; a case substantially hermetically enclosing the unit, said case comprising two opposite rigid wall sections and two gaskets of soft elastic material clamped between the rigid sections and together forming wall sections of the case; and a rotatable spindle connected to the unit and extending through a wall of the case between the said soft gaskets, said spindle being adapted in operation to yield elastically in torsion to a substantial extent in transmitting vibratory motion to and from the piezo-electric unit.

13. In a piezo-electric apparatus, the combination of a piezo-electric unit of the multiple-plate flexing type; an operative support for the said unit; and a spindle operatively connected to the piezo-electric unit, said spindle being adapted to yield elastically in torsion to a substantial extent in transmitting motion to or from the said unit.

ALFRED L. W. WILLIAMS.